United States Patent
Shoup

(10) Patent No.: US 9,505,601 B2
(45) Date of Patent: Nov. 29, 2016

(54) PORTABLE DRINK DISPENSER WITH ADJUSTABLE HEIGHT STAND

(71) Applicant: Derek Ray Shoup, Wendell, NC (US)

(72) Inventor: Derek Ray Shoup, Wendell, NC (US)

( * ) Notice: Subject to any disclaimer, the term of this patent is extended or adjusted under 35 U.S.C. 154(b) by 66 days.

(21) Appl. No.: 13/788,188

(22) Filed: Mar. 7, 2013

(65) Prior Publication Data

US 2014/0252040 A1 Sep. 11, 2014

(51) Int. Cl.
| | | |
|---|---|---|
| *B67D 7/84* | (2010.01) | |
| *B67D 3/00* | (2006.01) | |
| *F16M 11/24* | (2006.01) | |
| *F16M 11/30* | (2006.01) | |

(52) U.S. Cl.
CPC .............. *B67D 3/0083* (2013.01); *B67D 3/00* (2013.01); *B67D 3/0054* (2013.01); *F16M 11/24* (2013.01); *F16M 11/30* (2013.01); *F16M 2200/08* (2013.01); *F25D 2331/806* (2013.01)

(58) Field of Classification Search
CPC ........... A47G 19/00; B60P 3/22; B67D 7/06; B67D 7/84; F16M 11/24; F16M 11/30; F16M 2200/08; F25D 2331/806
USPC ......... 222/160, 185.1, 465.1, 466, 608, 612, 222/146.1, 146.6, 186, 522–524; 248/157, 248/161, 292.12, 188.1–188.9, 74.1, 121, 248/125.6, 65; 473/483, 479, 481; 220/475, 220/480, 629, 592.03, 592.17–592.18
See application file for complete search history.

(56) References Cited

U.S. PATENT DOCUMENTS

| | | | | | |
|---|---|---|---|---|---|
| 599,027 | A | * | 2/1898 | Thompson | 222/160 |
| 1,751,323 | A | * | 3/1930 | Gray | 222/340 |
| 2,059,965 | A | * | 11/1936 | Joncha | 222/38 |
| 5,158,281 | A | * | 10/1992 | Williams | A63B 63/083 248/910 |
| 5,163,579 | A | * | 11/1992 | Jones | B65F 1/068 220/629 |
| 5,163,676 | A | * | 11/1992 | Taub | A63B 63/083 248/412 |
| 5,174,223 | A | * | 12/1992 | Nagy et al. | 108/50.01 |
| 5,269,434 | A | * | 12/1993 | Labuda | B65F 1/068 220/495.06 |
| 5,295,369 | A | * | 3/1994 | Garcia | 62/389 |
| 5,353,607 | A | * | 10/1994 | McBride | 62/457.7 |
| 5,632,480 | A | * | 5/1997 | Davis | A63B 71/023 248/161 |
| 5,673,825 | A | * | 10/1997 | Chen | 222/646 |
| 5,870,647 | A | * | 2/1999 | Nada et al. | 399/18 |
| 6,047,866 | A | * | 4/2000 | Brown | 222/608 |
| 6,047,935 | A | * | 4/2000 | Wright | F24F 13/32 248/188.2 |

(Continued)

OTHER PUBLICATIONS

Kosmo Coolers, Camping Equipment & Supplies, Fort Smith, Ar. 72901, http://www.kosmocoolers.com/.

*Primary Examiner* — Paul R Durand
*Assistant Examiner* — Andrew P Bainbridge
(74) *Attorney, Agent, or Firm* — James G. Passé; Passé Intellectual Property, LLC

(57) ABSTRACT

The invention discloses a carrier stand for a sports cooler having a travel closed position on a taller dispensing position. The stand can be integrated or removable from the cooler.

6 Claims, 1 Drawing Sheet

(56) References Cited

U.S. PATENT DOCUMENTS

| | | | |
|---|---|---|---|
| 6,361,001 B1* | 3/2002 | Durand | B01F 15/00681 248/146 |
| 6,688,135 B1 | 2/2004 | Mattia | |
| 6,808,081 B1* | 10/2004 | Citro | B65D 25/2805 116/63 P |
| 6,820,765 B2* | 11/2004 | Pahl | 222/95 |
| D499,598 S | 12/2004 | Guadalupi | |
| 7,055,834 B1* | 6/2006 | White et al. | 280/47.35 |
| 7,293,748 B1* | 11/2007 | Hoser | F16M 11/28 248/125.8 |
| 7,341,164 B2 | 3/2008 | Barquist et al. | 220/629 |
| 7,490,739 B2 | 2/2009 | Prabucki | 222/146.6 |
| 7,896,451 B2* | 3/2011 | Walsh | A47F 3/043 312/139.2 |
| 8,033,417 B1* | 10/2011 | Fallacaro | A47J 43/0727 220/629 |
| 8,123,069 B1* | 2/2012 | Mumaw et al. | 220/694 |
| 8,231,030 B2* | 7/2012 | Lassota | 222/185.1 |
| 8,408,420 B2* | 4/2013 | Almada et al. | 222/1 |
| 8,511,110 B2* | 8/2013 | Kim | 62/457.4 |
| 8,752,799 B2* | 6/2014 | Johnson | A61B 19/26 211/85.13 |
| 8,844,950 B2* | 9/2014 | Greene | B25H 1/04 280/30 |
| 8,882,064 B2* | 11/2014 | Gregg, Jr. | F16M 11/38 108/118 |
| 2006/0283883 A1* | 12/2006 | Mika et al. | 222/129 |
| 2007/0277547 A1* | 12/2007 | Veeravagu | B67D 3/0009 62/396 |
| 2008/0022848 A1* | 1/2008 | Pastrnak | F41H 5/08 89/36.09 |
| 2008/0197587 A1* | 8/2008 | Nowak | B62B 1/264 280/30 |
| 2011/0062180 A1* | 3/2011 | Mullett et al. | 221/45 |
| 2013/0037568 A1* | 2/2013 | Smith et al. | 222/105 |

* cited by examiner

PORTABLE DRINK DISPENSER WITH ADJUSTABLE HEIGHT STAND

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a drink cooler. In particular it relates to a drink cooler with an attached adjustable height stand.

Description of Related Art

Portable liquid dispersers/coolers such as a drink dispenser coolers or sports cooler chests are utilized in a wide number of applications including sporting events, constructions sites and the like where activity is maintained and no other water, food or drinks are readily available to alleviate thirst or hunger from physical activity. Devices are typically 1, 5, 10 gallon capacity or more but small enough to be transported via one or two handles. These devices rely on gravity to dispense liquids. Liquids in the cooler can be removed via a spigot at the bottom of the cooler. In cooler chests, one removes food, water or drinks from the top.

These coolers have several problems but are tolerated because of the convenience of the device. One problem though that is always there is that in order to dispense liquids from the cooler, one has to hold a cup or container below the spigot. If the device is on the ground, it's not possible to do that. If a truck bed, table or the like is around it's not a problem. If one is in a field, for example, at a sporting event, someone needs to pick up the cooler in order for someone else to dispense a liquid or get something out of it. While a regular stand is available, it creates problems for transportation and use.

BRIEF SUMMARY OF THE INVENTION

The above problems have been alleviated by the present invention which provides an integrated stand that has a first lower position for transportation and a second raised position for drink dispensing.

Accordingly, in one embodiment, the present invention discloses a sports cooler or a liquid drink dispenser cooler comprising an integrated adjustable height stand having a lower position for storage and an upper position for drink dispensing.

DETAILED DESCRIPTION OF THE INVENTION

Figure 1:
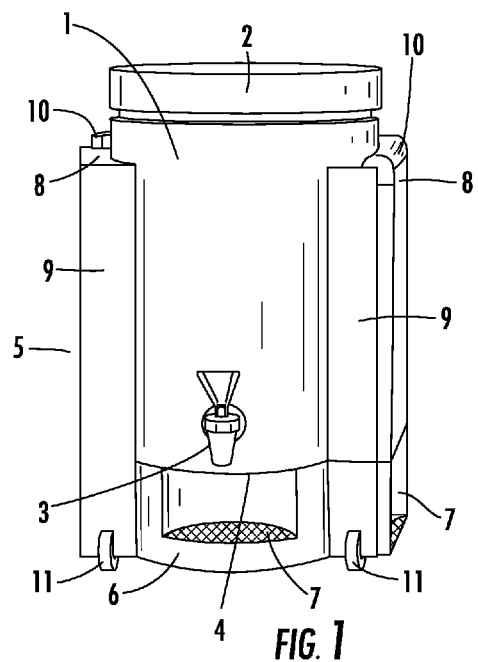
FIG. 1 is a cooler with an adjustable height stand with the cooler in the lower position.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "about" and "essentially" mean±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein a "liquid drink dispenser cooler" refers to any type of cooler for holding drinks that is small enough to be transported by a small number of people such as a 1, 5, 10, 20, 50 gallon or the like cooler that can be carried by 1, 2, 3, 4, or 5 or more people at the same time. It is also outfitted with a drink dispensing spigot at the bottom (usually the bottom side but could also be the bottom) of the cooler to remove liquid via gravity. The spigot can be the type normally used on coolers and is within the skill in the art. A "sports cooler" as used herein refers to any type of device such as an "ice chest" for keeping drinks or food cold. In one embodiment, it has a top-opening lid.

As used herein an "integrated adjustable height stand" refers to a device attached to the cooler or a part of the cooler that has a lower position, which has a storage position for transportation, and an upper position of the cooler for dispensing drinks or food by providing enough room to place a container underneath the spigot when appropriate use of the word cooler refers to both sports and liquid dispensing cooler unless noted otherwise and dispense a liquid or food from the cooler. In one embodiment, the device has multiple height positions it can be adjusted to. In one embodiment, there is a base the cooler sits upon in the lower position and two or more upright arms as vertical side portions which guide the cooler from a lower to an upper position. A review of the drawings gives the reader a clear explanation of how the embodiment would work. While two arms are shown in the drawings it is clear that any number of arms could be utilized including two, three or more arms. One embodiment has telescoping arms which, when collapsed, has the cooler in the lower position and then expanding the telescoping arms raises the cooler to the upper position. The arms could have integrated handles or the handles could be separate and on the cooler. There could be zero, one, two, three or more handles. The arms would lock in an upper position or lower and a release button, push bar or the like would release the arms to lower the cooler to the lower position or to raise the cooler to the upper position. In another embodiment, the device is not integrated into the cooler but separate and detachable.

In one embodiment, the base has a foothold device so that the user can hold the base down while raising the cooler to an upper position. So, in one embodiment the user would step on the foothold and grab the cooler, can lock it where necessary, and raise it to the upper position all in one motion. To lower the device one would unlock the arms and guide the cooler to the lower position. If the base is high enough, a drink can be withdrawn from the cooler in the lower position since it is off the ground.

Now referring to the drawings FIG. 1 is a cooler of the present invention in the down position. The cooler 1 has lid 2 spigot 3 and cooler bottom 4. Wheels 11 are shown with base, but can be anywhere within the skill in the art. While a drink dispenser is shown, a sports cooler could substituted as well. The stand 5 comprises a base 6 which cooler bottom 4 sits on when in the down position. The base 6 in this embodiment is about 4 inches in height but could be any convenient height to allow carrying and the used of the present invention as intended herein. The base has foothold 7 for stepping on when in the process of raising the cooler on the stand 5. In this position one can carry cooler 1 by grabbing handles 8 on upright arms 9. In this embodiment, the base is attached to the cooler 1 but could easily be molded as a part of the cooler as desired or the stand could be designed as a separate product to be added to an existing cooler by attaching the stand to the cooler. In this embodiment, a push bar 10 keeps the telescoping arms 9 locked in place either in the down or up position and can be used to raise and lower and lock in place using two hands and one motion quickly and easily.

Figure 2:
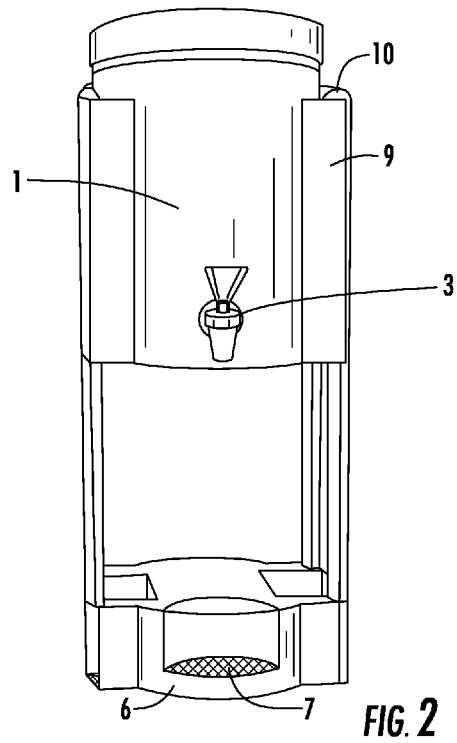
FIG. 2 is a cooler with an adjustable height stand with the cooler in the upper dispensing position.

Arms 9 are telescoping in nature and in FIG. 2 one can see that the cooler 1 has been raised to an upper position (about 16 to 18 inches off the floor in this example) by telescoping arms 9. The exact height of the cooler will depend on the cooler arms height and how much they can telescope upward. One skilled in the art in view of the present invention could determine how much they would telescope but it could be from 5 inches to about 30 inches or more but in other embodiments about 15 to 20 inches in height.

In the use of the present invention the user places a foot on the foothold to hold the stand in place, grabs the cooler handles, unlocks it, and lifts it until it locks in place in the upright position. To lower the cooler, the locks on the handles are pressed again and the cooler allowed to lower under its own weight or pushed down into place and locked depending on the resistance of the telescoping device used.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the Applicant.

What is claimed is:

1. A method of using a cooler for carrying and dispensing food or drink while keeping said cooler cold comprising:
   a) providing an insulated cooler that selectively stores and dispenses food or drink while keeping said cooler cold comprising
   b) an adjustable height stand having two or more vertical arms, a base and a foothold device,
   c) each of said two or more vertical arms having an attached carry handle, each of said carry handles attached to or integral with said cooler,
   d) said cooler having a lower position wherein said cooler rests upon said base and said cooler having an upper position wherein said cooler does not rest upon said base such that said cooler can be selectively raised or lowered between said upper position and said lower position,
   e) said cooler is height adjustable by raising or lowering said carry handles with respect to said two or more vertical arms
   f) wherein said adjustable height stand has means for connecting height adjustably to said cooler, and
   g) wherein said foothold device is configured to hold said adjustable height stand in position with a user's foot while a user raises said cooler from said lower position to said upper position and
   h) wherein said carry handles are configured to lift said cooler from said lower position to said upper position and
   i) said cooler can be selectively carried by grasping said carry handles when said cooler is in said lower position
   j) wherein said means for said adjustable height stand connecting height adjustably to said cooler comprises the user simultaneously: stepping on the foothold, grabbing said cooler by grabbing said carry handles and raising said cooler from said lower position to said upper position all in one motion.

2. The method according to claim 1 wherein the cooler is held in place in at least either the upper position or the lower position by a releasable locking mechanism.

3. The method according to claim 1 wherein wheels on the cooler or the adjustable height stand base are configured for rolling on the ground.

4. The method according to claim 1 wherein the cooler is removable from the stand.

5. The method according to claim 1 wherein the stand comprises two vertical arms connected at a lower end to the base.

6. The method according to claim 1 wherein the cooler is selected from the group consisting of a sports food cooler and cooler for dispensing liquids.

\* \* \* \* \*